US006968368B2

United States Patent
Eitel et al.

(10) Patent No.: US 6,968,368 B2
(45) Date of Patent: Nov. 22, 2005

(54) STREAMING ANNOUNCEMENTS TO AGENTS OF AN ACD

(75) Inventors: Robert T. Eitel, Bartlett, IL (US); Michael C. Hollatz, Huntley, IL (US)

(73) Assignee: Rockwell Electronic Commerce Technologies, LLC, Wood Dale, IL (US)

(*) Notice: Subject to any disclaimer, the term of this patent is extended or adjusted under 35 U.S.C. 154(b) by 747 days.

(21) Appl. No.: 09/966,688

(22) Filed: Sep. 28, 2001

(65) Prior Publication Data

US 2003/0065801 A1 Apr. 3, 2003

(51) Int. Cl.$^7$ .......................... G06F 15/16; H04M 1/64
(52) U.S. Cl. ................. 709/219; 709/231; 379/93.01; 379/265.02; 379/88.17
(58) Field of Search ...................... 709/219, 223–224, 709/231, 240–242; 379/93.01, 88.17

(56) References Cited

U.S. PATENT DOCUMENTS

| | | | | |
|---|---|---|---|---|
| 5,073,890 A | * | 12/1991 | Danielsen | 370/270 |
| 5,905,776 A | * | 5/1999 | Shaffer | 379/88.22 |
| 6,061,347 A | * | 5/2000 | Hollatz et al. | 370/352 |
| 6,092,178 A | * | 7/2000 | Jindal et al. | 712/27 |
| 6,351,775 B1 | * | 2/2002 | Yu | 709/238 |
| 6,449,734 B1 | * | 9/2002 | Shrivastava et al. | 714/15 |
| 6,606,643 B1 | * | 8/2003 | Emens et al. | 709/203 |
| 6,633,636 B1 | * | 10/2003 | McConnell et al. | 379/220.01 |
| 6,754,327 B1 | * | 6/2004 | Baker et al. | 379/219 |
| 6,807,257 B1 | * | 10/2004 | Kurganov | 379/88.22 |

OTHER PUBLICATIONS

Microsoft Corporation (2002). Micrsoft's Computer Dictionary (5th Ed). Redmond,Washington: Microsoft Press.*

* cited by examiner

*Primary Examiner*—Saleh Najjar
*Assistant Examiner*—Asad Nawaz
(74) *Attorney, Agent, or Firm*—Welsh & Katz, Ltd.

(57) ABSTRACT

A method and apparatus are provided for obtaining audio information through the Internet by agents of an automatic call distributor situated at a plurality of remotely located terminals. The method includes the steps of transmitting a sign-on request from a first terminal of the plurality of remotely located terminals to a server of the automatic call distributor through the Internet notifying the server that an associated agent of the first terminal is ready for receiving calls, retrieving a universal resource locator of a web file server containing the audio information needed by the associated agent of the first terminal, said web file server being located on a second terminal of the plurality of remotely located terminals and downloading the audio information through the Internet from the web file server specified by the universal resource locator to the first terminal.

30 Claims, 1 Drawing Sheet

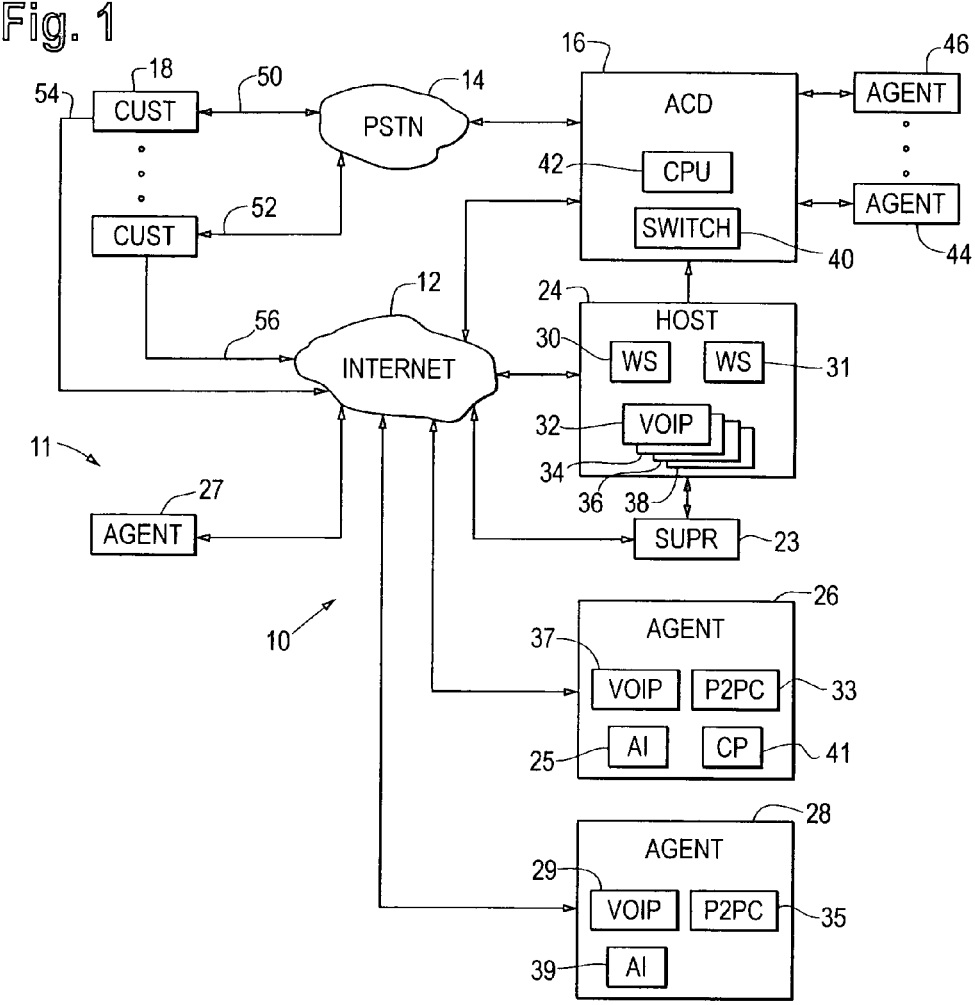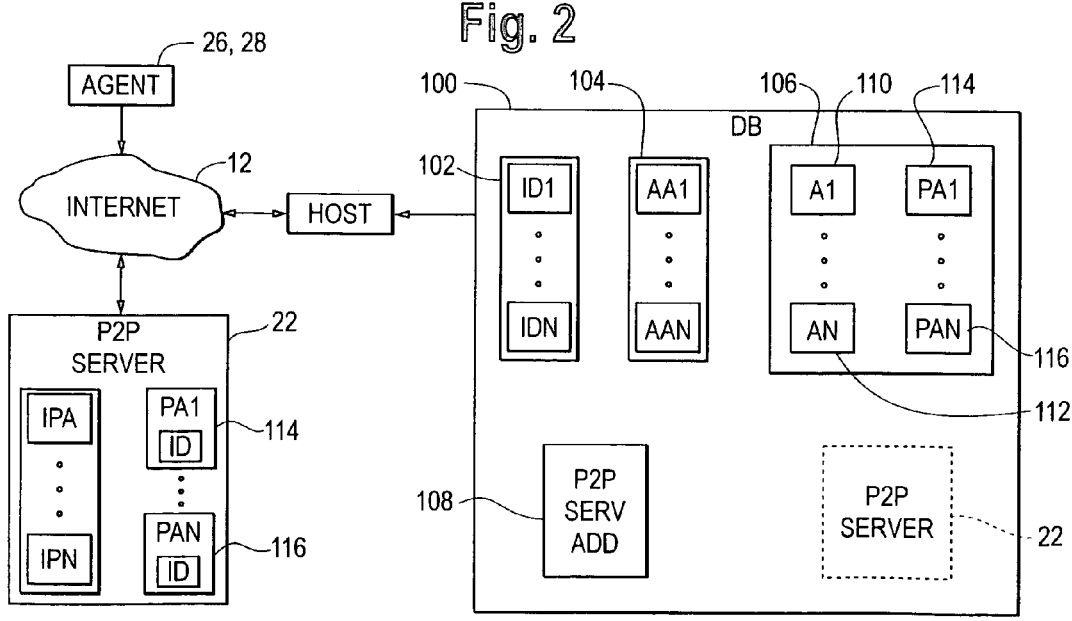

STREAMING ANNOUNCEMENTS TO AGENTS OF AN ACD

FIELD OF THE INVENTION

The field of the invention relates to communication systems and more particularly to automatic call distributors.

BACKGROUND OF THE INVENTION

Automatic call distributors (ACDs) are known. Such devices are often used by telemarketing organizations to automate the flow of incoming or outgoing calls.

In order to successfully market products, an owner or operator of the ACD may require large numbers of agents familiar with the marketed product. Often the agents relied upon are not physically present at the site of the ACD.

In order to attract and retain qualified agents, ACD operators often recruit agents who are willing to telecommute through the Internet. Virtual voice paths may be established between the ACD and agents using voice-over-IP (VoIP) protocols (e.g., H.323). Once a virtual voice path has been created between the ACD and agent, conventional circuit switching may be used to route calls to agents and vice versa.

In order to sign-in at a beginning of a shift, the agent may access a server of a host of the ACD through the Internet and enter a password. Upon detecting the password, the ACD may log-in the agent as available for receiving calls.

While the process of routing calls to agents through the Internet works relatively well, it is difficult and time consuming to download supporting information to an agent at a beginning of each shift. For example, administrative announcements or announcements concerning call handling may need to be periodically provided at the beginning of each shift. Where a dozen (or several hundred) remotely-located agents sign-on within a short period, the load on the ACD host can be significant.

In addition, agents often record and save personal announcements for a variety of different call types. These announcements are typically saved in an ACD server and downloaded based upon work assignments. Because of the importance of the efficient use of agents in telemarketing, a need exists for a better method of providing information to remotely located agents.

SUMMARY

A method and apparatus are provided for obtaining audio information through the Internet by agents of an automatic call distributor situated at a plurality of remotely located terminals. The method includes the steps of transmitting a sign-on request from a first terminal of the plurality of remotely located terminals to a server of the automatic call distributor through the Internet notifying the server that an associated agent of the first terminal is ready for receiving calls, retrieving a universal resource locator of a web file server containing the audio information needed by the associated agent of the first terminal, said web file server being located on a second terminal of the plurality of remotely located terminals and downloading the audio information through the Internet from the web file server specified by the universal resource locator to the first terminal.

BRIEF DESCRIPTION OF THE DRAWINGS

FIG. 1 is a block diagram of an automatic call distributor, shown generally in accordance with an illustrated embodiment of the invention; and FIG. 2 is a block diagram of information flow between terminals and peer-to-peer servers.

DETAILED DESCRIPTION OF A PREFERRED EMBODIMENT

FIG. 1 is a block diagram of an ACD system 10, generally in accordance with an illustrated embodiment of the invention. As shown, customers 18, 20 may participate in calls with agents of the ACD 16 through the PSTN 14 (and switched circuit connections 50, 52) or through the Internet 12 (and virtual connections 54, 56).

As also shown in FIG. 1, the ACD system 10 may have a number of terminals 26, 27, 28 of remotely located agents. Each agent terminal 26, 27, 28 may include a VoIP application 25, 29 for establishing a voice connection with customers 18, 20.

Within the host 24 a number of respective VoIP applications 32, 34, 36, 38 are provided, each of which may be coupled to a respective port of the switch 40. Each VoIP application 32, 34, 36, in turn, may be selectively associated with a respective VoIP application of a remote terminal 26, 27, 28. Where a call is received from a customer 18, 20 through the PSTN 14, the switch 40 of the ACD 16 and VoIP applications 25, 29, 32, 36, 38 may be used to route a call to a selected remote agent.

In order to administrate the effective use of the remotely located agents, audio information (e.g., system announcements, personal announcement, etc.) may need to be downloaded to each remote agent. Under the illustrated embodiment, agent terminals 26, 27, 28 already having that information may serve as web servers for other terminals 26, 27, 28 under a peer-to-peer (P2P) arrangement.

While only two customers 18, 20 are shown in FIG. 1, it would be understood than any number of customers 18, 20 may be contacted and serviced in any given time period. It is also to be understood that while the switched circuit connection 50, 52 and virtual circuit connection 54, 56 are shown separately, it is to be understood that a customer 18, 20 may access the Internet 12 through a local connection with the PSTN 14.

As calls are detected at the ACD system 10 through the PSTN 14 or Internet 12, they may be processed by the ACD 16 (in the case of switched circuit calls) or by the host 24 (in the case of VoIP calls). Switched circuit calls may be detected by call arrival messages transferred from the PSTN 14 to a CPU 42 of the ACD 16. Virtual circuit calls may be initiated by a customer accessing a web site 30 of the host 24 and requesting contact with an agent using a VoIP connection through the Internet 12.

In either case, an agent selection unit of the ACD system 10 (e.g., the CPU 42, host 24, etc.) may select an agent 26, 27, 28, 44, 46 to handle the call. Upon selection of an agent the call may be transferred to the agent.

Turning now to the remote agents 26, 27, 28, an explanation will be offered of the set-up of the remote agent terminals 26, 27, 28 using information originating from the ACD system 10. Following the explanation of the interaction of the agents 26, 27, 28 with the system 10, a number of examples will be offered.

In general, remote agents 26, 27, 28 may be scheduled for work shifts during predetermined time periods. At a beginning of a work shift, an agent 26, 27, 28 may log onto an web site 31 using a communication processor 41 and enter an agent identifier (ID) into an interactive window (not shown) provided for that purpose.

Upon detecting the ID, the host 24 may compare the entered ID with a list 102 of IDs (FIG. 2). If a match is found, then the host 24 may enter the ID and IP address of the agent 26, 27, 28 into an active agent's list 104. The host 24 may send the agent 26, 27, 28 a universal resource locator (URL) (i.e., an IP address) 108 of a virtual peer-to-peer (P2P) address server 22.

Upon receiving the IP address 108 of the P2P server 22, a P2P client 33, 35 within the agent terminal 26, 27, 28 may access the virtual server 22 for IP addresses of sources (i.e., web files servers) of the audio information. Upon retrieving the IP addresses of the locations of the audio information, the P2P client 33, 35 of the agent 26, 27, 28 may retrieve and use the information from the web file server.

It should be noted in this regard that the client server 33, 35 may act in two different capacities depending upon the situation. For example, as used herein, the term "web server" refers to the client server 33, 35 in the capacity as a supplier of files. Alternatively, the client server 33, 35 may also function as a requesting server when it asks another web server 33, 35 for a particular file.

In general, the audio files 106 may be encoded under any appropriate file format (e.g., MP3, WAV, etc.). Distribution and retrieval of the files may be accomplished under any appropriate peer-to-peer format (e.g., Napster, Alpine Network, Audiogalaxy Satellite, eDonkey 2000, Farsite, Filetopia, etc.).

The P2P server 22 may be found at a predetermined IP address or may exist as a virtual file server (e.g., as provided by Farsite). The advantage of structuring the P2P server 22 as a virtual entity is that no dedicated server 22 is required and, consequently, terminals of agents 26, 27, 28 providing the function of the virtual server 22 may sign-on and off without affecting operation of the server 22.

Where the P2P server 22 exists at a predetermined IP address, a dedicated server 22 may be provided for use exclusively by agents of the ACD system 10 or a server 22 may be shared by other users (e.g., Napster music users). Where the server 22 is shared, the host 24 may set up links to and agents may obtain audio files from other P2P clients based upon source information retrieved from the shared P2P server 22 (e.g., opennap).

Alternatively a dedicated virtual P2P network 11 may be provided based upon sign-on and sign-off of individual agents 26, 27, 28. The P2P network 11 may be dedicated in that terminals 26, 27, 28 are dedicated to support of the P2P network 11. The P2P network 11 is virtual in that it exists only on agent terminals logged into the system 10.

Within the dedicated virtual P2P network 11, agent terminals may provide the dedicated hardware for the server 22, but only so long as the agents are signed onto the system 10 through their terminals. As the agents sign-off, the virtual server 22 may be moved to other dedicated hardware.

As an example of start-up of the system 10, when a first agent (e.g., 26) signs-on to the host 24, the host 24 may designate itself as the P2P server 22. In acknowledging sign-on by the terminal 26, the host 24 may include its own IP address as the address 108 of the P2P server 22. The host 24 may also download the P2P client 33 to the terminal 26.

The host 24 may also download a list of identifiers of audio files 106 needed by the agent of the terminal 26. Alternatively, the list of identifiers may be permanently stored in the terminal 26.

Once the terminal 26 has received acknowledgement of sign-on and an identifier of the server 22, the terminal 26 may send an information request to the server 22 and may subsequently download audio files 106 to that P2P client 33. Downloading may occur under a streaming format. Once the terminal 26 has downloaded the audio files 106, an agent of the terminal 26 may listen to any announcements and activate a release key (not shown) indicating his availability for receiving calls.

Once the first terminal 26 has signed-on, a second terminal (e.g., 27) may also sign-on. Sign-on of the second terminal 27 may occur substantially as described above, with the following exception. When the second terminal 27 signs-on, the server 22 within the host 22 may now designate the first terminal 26 as the source of audio files 106.

Another exception may be that the host 24 may now designate the second terminal 27 as the server 22. Accordingly, the host 24 may download software defining the server 22 within the second terminal 27. The host 24 may also enter the IP address of the second terminal 27 as the address 108 of the server 22.

Further, the host 24 may designate the second terminal 27 as the server 22 as part of the acknowledgement process or at any time thereafter. For example, the host 24 may retain the server 22 as one of its multiprocessing capabilities during set-up of the second terminal 27. The acknowledgement message to the second terminal 27 may include its own IP address as that of the server 22. The second terminal 27 may send a file request message to the server 22 within the host 24 for the files 106. The server 22 within the host 24 may respond with an IP address of the first terminal 26 as a file source. The second terminal 27 may send a file request message to the first terminal 26 requesting the files 106. The host 24 may also set a flag within the second terminal 27 requesting notification of completion of file transfer from the first terminal 26 to the second terminal 27.

Once transfer of the files 106 from the first terminal 26 to the second terminal 27 is complete, the agent of the second terminal 27 may proceed to review any announcements present within the files 106. While the agent reviews the announcements, the host 24 upon notification of transfer completion may begin setting up the second terminal 27 as server 22.

Setting up the second terminal 27 as server 22 may include downloading any server software (if necessary) and inserting the IP address of the second terminal 27 and code plug of the server software 22 within the second terminal 27 in the appropriate fields of the server address 108 within the host 24. The host 24 may also send a message to the first terminal 26, notifying the first terminal of the new address of the server 22.

As another agent signs-on (e.g., terminal 28), the process may proceed accordingly. First, the host 24 may verify the identity of the terminal 28. The host 24 may then list the terminal 28 in the active agent list 104. Finally, the host 24 may download an acknowledgement message to the terminal 28 identifying the server 22 within the second terminal 27.

Upon receiving the acknowledgement message, the third terminal 28 may send a message to the server 22 within the second terminal 27 asking for a source of the records 106. The server 22 may respond with an IP address and code plug of a P2P client 33, 35 in either the first terminal 26 or second terminal 27. The third terminal 28 may download the files 106 from either source.

In another embodiment of the invention, personal announcements 114, 116 of agents may be downloaded to one or more P2P clients 33, 35 during start-up. While personal announcements 114, 116 may be associated with individual terminals 26, 27, 28, the offloading of personal announcements from the host 24 to one or more individual terminals 26, 27, 28 may be used as a means to reduce the overall traffic handled by the host 24.

As the personal announcements are downloaded to P2P clients 33, 35, a record of the locations of those files and an identifier of the terminals 26, 27, 28 needing those files are also downloaded to the P2P server 22.

As the individual terminals 26, 27, 28 access the server 22 for files 106, they may also include their own IP address. The server 22 may compare the IP address of the terminal with identifiers associated with each personal announcement file 114, 116 and respond with a location of the appropriate file 114, 116. The personal announcement file 114, 116 may be downloaded accordingly.

A specific embodiment of a method and apparatus for obtaining audio information by an agent of an automatic call distributor has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of obtaining audio information through the Internet by a plurality of agents of an automatic call distributor, where each agent of the plurality of agents is situated at a respective remotely located agent terminal of the automatic call distributor, such method comprising the steps of:
   transmitting a sign-on request from a remotely located terminal of a first agent of the plurality of agents to a server of the automatic call distributor through the Internet notifying the server that the first agent is ready for receiving calls;
   retrieving a universal resource locator of a web file server containing the audio information needed by the first agent, said web file server being located on a remotely located terminal of a second agent of the plurality of agents of the automatic call distributor; and
   downloading the audio information through the Internet from the web file server specified by the universal resource locator from the remotely located terminal of the second agent to the remotely located terminal of the first agent.

2. The method of downloading audio information as in claim 1 further comprising defining the downloaded audio information as administrative announcements relating to operation of the automatic call distributor.

3. The method of downloading audio information as in claim 1 wherein the step of downloading further comprises downloading under a streaming format.

4. The method of downloading audio information as in claim 1 wherein the step of downloading the audio information further comprises downloading an MP3 file to the terminal of the first agent.

5. The method of downloading audio information as in claim 1 further comprising downloading the universal resource locator from the server of the automatic call distributor.

6. The method of downloading audio information as in claim 1 wherein the step of retrieving the universal resource locator of the web file server further comprises accessing a web address server.

7. The method of downloading audio information as in claim 6 wherein the step of accessing the web address server further comprises transferring an identifier of the remotely located terminal of the first agent and file identifier to the web address server.

8. The method of downloading audio information as in claim 7 further comprising downloading personal announcements of the first agent.

9. The method of downloading audio information as in claim 6 further comprising downloading software defining the web address server to a remotely located terminal of a third agent of the plurality of agents at a beginning of a work shift.

10. The method of downloading audio information as in claim 9 further comprising moving the web address server to a remotely located agent terminal of a fourth agent of the plurality of agents at an end of the work shift.

11. The method of downloading audio information as in claim 6 further comprising retrieving a universal resource locator address of the web address server from an acknowledgment message received from the automatic call distributor.

12. The method of downloading audio information as in claim 1 further comprising downloading software defining the web file server software to the remotely located terminal of the second agent at a beginning of a work shift.

13. The method of downloading audio information as in claim 12 further comprising moving the web file server to a remotely located terminal of a fifth agent of the plurality of agents at an end of the work shift.

14. An apparatus for providing audio information through the Internet to a plurality of agents of an automatic call distributor where each agent of the plurality of agents is situated at a respective remotely located terminal of the automatic call distributor, such apparatus comprising:
   means for transmitting a sign-on request from a remotely located terminal of a first agent of the plurality of agents to a server of the automatic call distributor through the Internet notifying the server that the first agent is ready for receiving calls;
   means for retrieving a universal resource locator of a web file server containing the audio information needed by the first agent, said web file server being located on a remotely located terminal of a second agent of the plurality of agents; and
   means for downloading the audio information through the Internet from the web file server specified by the universal resource locator to the remotely located terminal of the first agent.

15. The apparatus for downloading audio information as in claim 14 wherein the audio information further comprises administrative announcements relating to operation of the automatic call distributor.

16. The apparatus for downloading audio information as in claim 14 wherein the means for downloading further comprises means for downloading under a streaming format.

17. The apparatus for downloading audio information as in claim 14 wherein the means for downloading the audio information further comprises means for downloading an MP3 file to the remotely located terminal of the first agent.

18. The apparatus for downloading audio information as in claim 14 further comprising means for downloading the universal resource locator from the server of the automatic call distributor.

19. The apparatus for downloading audio information as in claim 14 wherein the means for retrieving the universal resource locator of the web file server further comprises means for accessing a web address server.

20. The apparatus for downloading audio information as in claim 19 wherein the means for accessing the web address server further comprises means for transferring an identifier of the remotely located terminal of the first agent and file identifier to the web address server.

21. The apparatus for downloading audio information as in claim 20 further comprising means for downloading personal announcements of the first agent.

22. The apparatus for downloading audio information as in claim 19 further comprising means for downloading software defining the web address server to a remotely located terminal of a third agent of the plurality of agents at a beginning of a work shift.

23. The apparatus for downloading audio information as in claim 22 further comprising means for moving the web address server to a remotely located terminal of a fourth agent of the plurality of agents at an end of the work shift.

24. The apparatus for downloading audio information as in claim 9 further comprising means for retrieving a universal resource locator address of the web address server from an acknowledgment message received from the automatic call distributor.

25. The apparatus for downloading audio information as in claim 14 further comprising means for downloading software defining the web file server software to the remotely located terminal of the second agent at a beginning of a work shift.

26. The apparatus for downloading audio information as in claim 25 further comprising means for moving the web file server to a remotely located terminal of a fifth agent of the plurality of agents at an end of the work shift.

27. An apparatus for providing audio information through the Internet to a plurality of agents of an automatic call distributor where each agent of the plurality of agents is situated at a respective remotely located terminal of the automatic call distributor, such apparatus comprising:
   a communication processor adapted to transmit a sign-on request from a remotely located terminal of a first agent of the plurality of agents to a server of the automatic call distributor through the Internet notifying the server that the first agent is ready for receiving calls;
   an address server adapted to retrieve a universal resource locator of a web file server containing the audio information needed by the first agent, said web file server being located on a remotely located terminal of a second agent of the plurality of agents; and
   a web server adapted to download the audio information through the Internet from the web file server specified by the universal resource locator to the remotely located terminal of the first agent.

28. The apparatus for downloading audio information as in claim 27 wherein the audio information further comprises administrative announcements relating to operation of the automatic call distributor.

29. The apparatus for downloading audio information as in claim 27 wherein the audio information further comprises an MP3 file.

30. The apparatus for downloading audio information as in claim 27 wherein the address server further comprises a virtual address server.

* * * * *